United States Patent

Hernandez

[11] Patent Number: 4,573,269
[45] Date of Patent: Mar. 4, 1986

[54] HEDGE TRIMMER

[76] Inventor: Paul C. Hernandez, 4709 Dahlia La., Victoria, Tex. 77901

[21] Appl. No.: 638,768

[22] Filed: Aug. 8, 1984

[51] Int. Cl.[4] ............................................. A01G 3/06
[52] U.S. Cl. ...................................... 30/240; 56/235; 56/255
[58] Field of Search ......................... 30/240, 207, 206; 56/255, 235

[56] References Cited

U.S. PATENT DOCUMENTS

| 640,587 | 1/1900 | Pollock | 56/295 |
|---|---|---|---|
| 1,472,587 | 10/1923 | Crowder | 56/233 |
| 2,016,939 | 10/1935 | Gooch | 56/255 |
| 2,443,027 | 6/1948 | Dishmaker | 30/206 |
| 2,449,091 | 8/1948 | Gardner | 56/295 |
| 2,504,268 | 4/1950 | Lee | 56/255 |
| 3,138,911 | 6/1964 | Pounds | 56/235 |
| 3,524,306 | 8/1970 | Reber | 56/295 |
| 3,618,304 | 11/1971 | Hundhausen | 56/255 |
| 3,711,946 | 1/1973 | Troutman | 30/276 |
| 3,950,923 | 4/1976 | Martensen et al. | 56/295 |
| 4,090,346 | 5/1978 | Doi | 56/255 |
| 4,196,568 | 4/1980 | Perry | 56/255 |
| 4,302,922 | 12/1981 | Guerndt, Jr. | 56/235 |

Primary Examiner—Jimmy C. Peters
Attorney, Agent, or Firm—Arnold, White & Durkee

[57] ABSTRACT

A powered trimmer is provided which cuts in the manner of a scissors rather than a saw. A plurality of cutting assemblies is arranged along the length of a generally horizontal support bar. Each cutting assembly includes a vertical shaft mounted with respect to the support bar and passing through the center of each of a pair of pulleys mounted for independent rotation about the shaft. A blade is affixed to each pulley. Drive means including an arrangement of endless belts and offset pulleys are provided to counter-rotate the upper and lower pulleys in each pair, and thus their corresponding blades, for the desired scissors-like cutting effect.

6 Claims, 4 Drawing Figures

U.S. Patent    Mar. 4, 1986    4,573,269
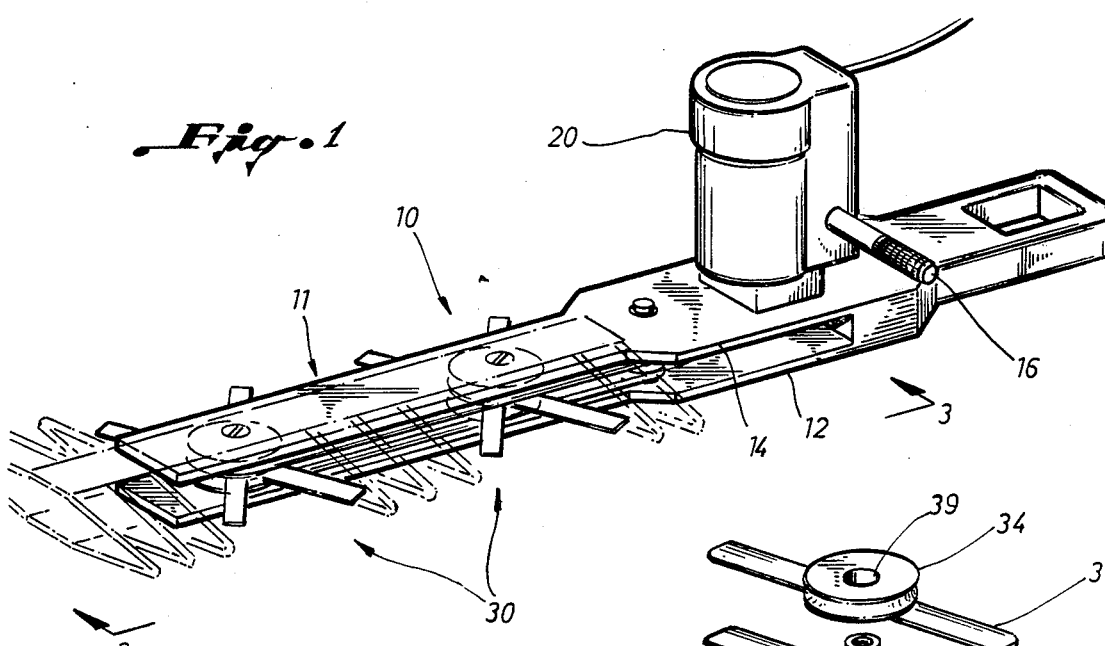
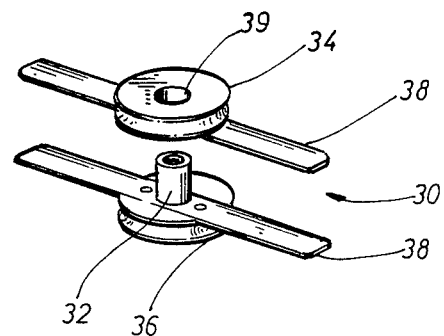
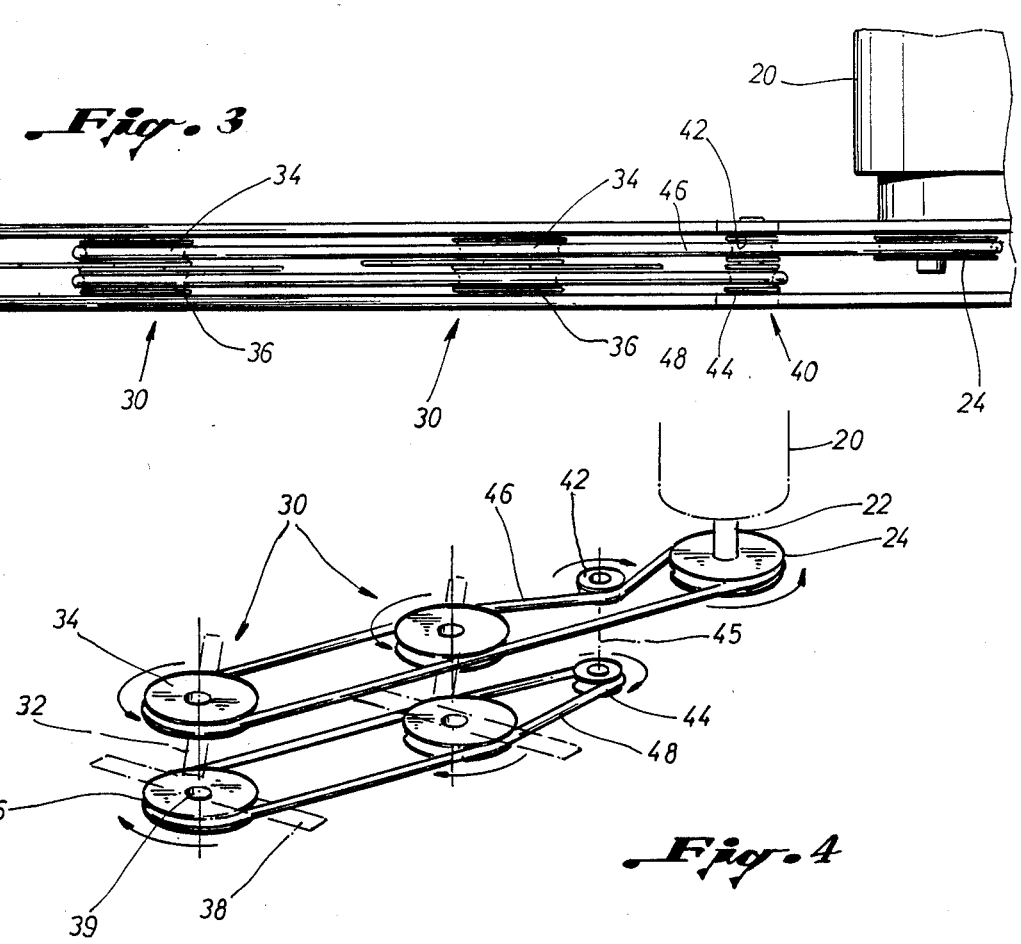

HEDGE TRIMMER

BACKGROUND OF THE INVENTION

This invention provides an improved apparatus for trimming hedges and other vegatation. The prior art includes many hedge trimming devices such as hand-held clippers and various powered cutter or trimmers.

Hand-held clippers often make use of a pair of scissors-like blades which grip tthe stem or branch during the cutting action, holding it relatively firmly in place. This permits precise cutting but is quite labor-intensive.

Many powered trimmers sold to home consmers, on the other hand, cut by reciprocating a teethed blade for a saw-like cutting action. If the stem or branch is very flexible, as is the case with many varieties of shrubbery, it can be pushed out of the path of the blade by the motion of the blade itself. This can result in ragged, uneven trimming and in concomitant extra work by the trimmer operator.

SUMMARY OF THE INVENTION

The present invention provides a powered trimmer which cuts in the manner of a scissors rather than a saw. A plurality of cutting assemblies is arranged along the length of a generally horizontal support bar. Each cutting assembly includes a vertical shaft mounted with respect to the support bar and passing through the center of each of a pair of knife-like blades symmetrically mounted for independent rotation about the shaft. Drive means are provided to counter-rotate the upper and lower blades in each pair for the desired scissors-like cutting effect.

(The terms "upper, " "lower," "horizontal," and "vertical" relate to the relative positions of components of the invention. These terms are used in this disclosure of the invention and in the attached claims solely to define a convenient frame of reference and not by way of limitation.)

In the presently preferred embodiment of the invention, each cutting assembly includes upper and lower pulleys concentrically mounted adjacent one another for independent rotation about the shaft. In each cutting assembly a blade, longer than the diameter of the upper pulley, is fixedly secured to the lower surface of the upper pulley so that the shaft passes vertically through an aperture in the center of the blade. Another blade is similarly secured to the upper surface of the lower pulley in each cutting assembly.

The cutting assemblies are driven by a driving assembly arranged on an end of the support bar. The driving assembly includes a driving pulley affixed to a vertical shaft rotated by an electric motor or other suitable device. Interposed between the driving pulley and the cutting assemblies are twin offset pulleys concentrically mounted for rotation together about a shaft mounted with respect to the support bar.

Two endless belts transmit the motor-driven rotation of the driving pulley to the cutting assembly pulleys in a manner that counter-rotates the upper and lower pulleys, and thus the upper and lower blades, in each cutting assembly.

An upper belt is trained over the drive pulley and the upper cutting assembly pulleys, but behind the upper offset pulley, to rotate the offset pulleys together in the opposite direction from the rotation of the upper cutting assembly pulleys.

A lower belt, on the other hand, is trained over the lower offset and lower cutting assembly pulleys to rotate those pulleys all in the same direction, namely the direction opposite the rotation of the upper cutting assembly pulleys.

BRIEF DESCRIPTION OF THE DRAWINGS

FIG. 1 is a perspective view of a trimmer in accordance with the presently preferred embodiment of the invention.

FIG. 2 is an exploded perspective view of a cutting assembly.

FIG. 3 is a cross-sectional view of the trimmer along the line 3—3.

FIG. 4 is an exploded perspective view of the preferred arrangement of the drive means and cutting assemblies.

Throughout the following detailed description, similar reference numerals refer to similar elements in all Figures of the drawings.

DETAILED DESCRIPTION OF THE INVENTION

A trimmer 10 in accordance with the present invention is shown in FIG. 1. The trimmer includes a support member 11 comprising two bars 12 and 14 arranged parallel to one another and spaced a suitable distance apart. The bars 12 and 14 may be fabricated from any suitable material such as steel or aluminum. A handle 16 is secured to one end of the support member 11.

Motor means 20 are mounted on the support member 11 adjacent the handle 16. An electric motor, diesel or gasoline engine, or other suitable apparatus may be used for the motor means 20. As shown in more detail in FIGS. 3 and 4, the motor means 20 are adapted to rotate a drive shaft 22 which is rotably mounted normal to and between the bars 12 and 14. The drive shaft 22 is affixed to a grooved drive pulley 24 to make use of well-known mechanical advantages.

A plurality of cutting asemblies 30 is arranged along the remaining length of the support member 11. In each cutting assembly 30, shown in exploded view in FIG. 2, a shaft 32 is mounted normal to and between the bars 12 and 14; twin grooved pulleys 34 and 36 are concentrically mounted adjacent each other for independent rotation about the shaft 32. A suitable spacer such as a washer, not shown, may be used to separate the pulleys 34 and 36.

A blade 38, longer than the diameter of the pulley 34, is affixed to the pulley 34; another blade 38 is similarly affixed to the pulley 36. The blades 38 are preferably of such a length as each to extend one-half of the distance between the centers of any two cutting assemblies 30, thus achieving maximum cutting coverage without mutual interference by the blades.

In the embodiment shown an aperture 39, large enough to accomodate the shaft 32, pentrates the center of each blade 38. The blades are symmetrically affixed, for example with machine screws, within diametric recessed channels in the lower and upper surfaces, respectively, of the pulleys 34 and 36.

Interposed between the drive shaft 22 and the cutting assemblies 30 is an offset pulley assembly 40, shown in detail in FIG. 4. Twin grooved pulleys 42 and 44 are concentrically mounted adjacent, and are joined, to one another for rotation together about a shaft 45, itself mounted normal to and between the bars 12 and 14.

An endless belt 46 is trained over the drive pulley 24, behind the upper offset pulley 42, and over the upper pulleys 34 of each cutting assembly 30, as shown in FIG. 4. The belt 46 is arranged so that rotation of the drive pulley 24 in one direction causes rotation of the upper pulleys 34 in that same direction but of the joined offset pulleys 42 and 44 in the opposite direction.

A second endless belt 48 is trained over the lower offset pulley 44 and the lower pulleys 36 of each cutting assembly, also as shown in FIG. 4. The belt 48 is arranged so that rotation of the joined offset pulleys 42 and 44 by the upper belt 46 causes the lower pulleys 36 to rotate in the same direction as the offset pulleys, namely in the opposite direction from the upper pulleys 34.

The counter-rotation of the upper and lower pulleys 34 and 36, and thereby of the corresponding blades 38, thus results in a scissors-like cutting action when the blades 38 come together.

It will be appreciated by those skilled in the art having the benefit of this disclosure that this invention is believed to be capable of application in other situations. A larger embodiment of the invention, for example, having numerous cutting assemblies and driven by a small engine or other suitable means, might be mounted in the bed of a truck for use in large-scale applications. The driving means might include a transmission adapted to transmit power from a truck engine to the cutting assemblies.

Accordingly, this description is to be construed as illustrative only and as for the purpose of teaching those skilled in the art the manner of carrying out the invention.

It is also to be understood that the form of the invention shown and described is to be taken as the presently preferred embodiment. Various modifications and changes may be made, e.g., in the shape, size, and arrangement of parts, without departing from the spirit and scope of the invention as set forth below in the claims; it is intended that the following claims be interpreted to embrace all such modifications and changes.

What is claimed is:

1. A trimmer comprising:
   an elongated support member;
   a plurality of cutting assemblies supported by and spaced along said support member;
   each said cutting assembly including
      a shaft substantially normal to said support member,
      first and second blades respectively fixed to first and second pulleys, said first and second pulleys being concentrically mounted for independent rotation about said shaft;
   first and second offset pulleys mounted for codirectional rotation with respect to the support member;
   an endless first belt trained about the first offset pulley and the first pulley of each cutting assembly,
   an endless second belt trained about the second offset pulley and the second pulley of each cutting assembly,
   said first and second belts being configured to rotate the first pulley of each cutting assembly and its respective second pulley in opposite rotational directions.

2. The trimmer of claim 1 wherein each blade is mounted symmetrically with respect to the shaft.

3. The trimmer of claim 1, further comprising motor means configured to drive said first belt.

4. The trimmer of claim 1, wherein:
   said first belt is configured to rotate the first pulleys of all said cutting assemblies in a first rotational direction when said first offset pulley is rotated in the opposite rotational direction; and
   said second second belt is configured to rotate the second pulleys of all said cutting assemblies in said opposite rotational direction so that said first and second blades in each said cutting assembly come together in a scissors-like cutting action.

5. The trimmer of claim 1, wherein said first and second offset pulleys are concentrically mounted rigidly with respect to one another for rotation with respect to said support member on a shaft mounted with respect to said support member.

6. A trimmer comprising:
   an elongated support member;
   a plurality of cutting assemblies supported by and spaced along said support member;
   each said cutting assembly including
      a shaft substantially normal to said support member, and
      first and second blades respectively fixed symmetrically to first and second pulleys, said first and second pulleys being concentrically mounted for independent rotation about said shaft;
   first and second offset pulleys concentrically mounted rigidly with respect to one another for rotation about an offset shaft mounted with respect to the support member;
   an endless first belt trained about said first offset pulley and the first pulley of each said cutting assembly so that all said first pulleys are rotated in a first rotational direction when said first offset pulley is rotated in the opposite rotational direction;
   an endless second belt trained about said second offset pulley and the second pulley of each said cutting assembly to rotate all said second pulleys in said opposite rotational direction so that said first and second blades in each said cutting assembly come together in a scissors-like cutting action; and
   motor means configured to drive said first belt.

* * * * *

UNITED STATES PATENT AND TRADEMARK OFFICE
CERTIFICATE OF CORRECTION

PATENT NO. : 4,573,269

DATED : March 4, 1986

INVENTOR(S) : Paul C. Hernandez

It is certified that error appears in the above-identified patent and that said Letters Patent is hereby corrected as shown below:

Column 2, line 58: [pentrates] --penetrates--.

Signed and Sealed this

Eighth Day of July 1986

[SEAL]

Attest:

DONALD J. QUIGG

Attesting Officer

Commissioner of Patents and Trademarks